UNITED STATES PATENT OFFICE.

ARMEN H. THOUMAIAN, OF BALTIMORE, MARYLAND.

FERMENTED-MILK FOOD PRODUCT AND PROCESS OF MAKING THE SAME.

1,101,044. Specification of Letters Patent. Patented June 23, 1914.

No Drawing. Application filed May 17, 1913. Serial No. 768,279.

*To all whom it may concern:*

Be it known that I, ARMEN H. THOUMAIAN, a citizen of the United States, residing at Baltimore, in the State of Maryland, have invented certain new and useful Improvements in Fermented-Milk Food Products and Processes of Making the Same, of which the following is a specification.

My invention relates to a new and improved fermented milk food product, and process of making the same.

The object of the invention is to provide a fermented milk food product which is highly palatable and nutritious, possesses good keeping qualities, is acceptable to the most delicate stomach and easily digestible, and is, therefore, a valuable article of diet for infants and invalids and others having impaired digestive organs, and which is, further, free from the objections incident to other fermented milk foods and, besides constituting a pleasant, agreeable and nourishing article of food and beverage, for general use, is of especial benefit and advantage in the alleviation and cure in general of all disorders of the digestive and intestinal tracts.

A further object of the invention is to provide a process of manufacture whereby a fermented milk food product of the character set forth may be reliably and efficiently prepared.

My improved fermented milk food product is prepared from pure, fresh, wholesome milk and cream, a special ferment combining the lactic acid bacillus and the Bulgaricus bacillus, and egg albumen. The milk and cream, after being cooled, tested and found thoroughly clean and free from disease germs, are placed in a suitable vessel and intimately combined, and either before or after admixture, but preferably after, are sterilized at a temperature below boiling, namely, at about 210° F. The sterilized mixture of milk and cream is then cooled to a suitably lower temperature, and at a temperature of from 170° to 180° F. a desired quantity of pure egg albumen is added thereto and thoroughly combined therewith, after which the special ferment is introduced and the mixture allowed to actively ferment under the action thereof for a period of from two to three hours, usually about two and one-half hours. The product is then chilled, strained and bottled or stored in other suitable receptacles for use.

In practice, cream in the proportion of from six to ten parts, or from six per cent. to ten per cent., and albumen in the proportion of from three to six parts, or from three per cent. to six per cent., to each one hundred parts of milk, are used, according to the degree of richness and nutritive qualities desired. It will, of course, be understood that, irrespective of other factors, the albumen renders the product more wholesome and nutritious than would otherwise be the case but, in addition, I have found that the albumen in this product employing lactic acid and Bulgaricus bacilli, exceptionally valuable properties, in that it acts as a vehicle and diffusing agent for the ferment and, hence, promotes and hastens the process of fermentation to a material degree. Moreover, after a certain period, namely, at the end of the most active stage of fermentation, it retards further fermentation, and, hence, serves as a preservative, enhancing the keeping properties of the product. Finally, the albumen performs the highly valuable and important function of reducing the acidity to a practically negligible point, an objection present in all other fermented milk food products with which I am familiar, and renders the product bland and soothing, acceptable to the most delicate stomach and non-irritating even in serious inflammatory conditions of the alimentary canal.

The product prepared in the manner described, and under the action of the special ferment set forth, is of a yellowish-white color, of thick cream-like consistency, smooth and without clots of separation, of a pleasant, faintly-acid odor and entirely free from cheese-like odor, totally devoid of acridity, and neither sweet nor sour, but of a most agreeable cream-like taste and delicious flavor. Unlike ordinary milk or cream, it is not constipating and does not leave a fatty taste in the mouth, but, on the contrary, is slightly laxative and leaves the mouth sweet and pure, and does not coagulate into curds in the stomach under the action of the gastric juices, remaining liquid, so that it is easily attacked by the gastric juices and may be digested in the most delicate stomach. It is for this, and the other reasons stated, of the utmost value in malnutrition, diseases of the digestive and intestinal tracts, fevers and other wasting diseases, as it may be retained and digested when all other food substances are rejected. It is also bland and healing in all inflammatory conditions.

Chemical analysis of this food product shows that it retains all the ingredients and food values of the original milk and cream, while being readily digestible, and having the other desirable qualities noted, the product containing protein (combined) five per cent., fat five and two tenths per cent. and carbohydrate, four per cent. Its calorific value per quart, is from eight hundred and fifty to one thousand calories, whereas the average good quality milk gives only from six hundred to six hundred and fifty calories. Bacteriological and microscopical examination shows the presence of a prolific growth of a short bacillus—the lactic acid bacillus, and a long bacillus known as the Bulgaricus bacillus, also a lactic acid-forming organism, one of the most vigorous known, and exceptionally few yeast cells and no colon bacillus pus or disease producing organisms. It is, therefore, antagonistic to the pathogenic and other disease producing germs which infest the intestinal tract, as well as those germs which produce fermentation in the refuse remaining from undigested food, and by prohibiting the growth of such germs acts as an intestinal antiseptic and preventive of many diseases.

The product may be weakened by the addition of water, if desired, to suit the taste or fancy, used as a beverage as well as a food, and served hot or cold. By evaporation it may be reduced to a powder, to which a required amount of water may be added when used.

I claim:—

1. A fermented milk food product having the following characteristics and properties, to wit: of a yellowish-white color, thick cream-like consistency, smooth and without clots of separation, a pleasant faintly-acid odor and freedom from cheese-like odor or acridity, neither sweet nor sour but of a cream-like taste and agreeable flavor, and non-curdling and freely digestible under the action of the gastric juices, the said product containing protein (combined) approximately five per cent., fat, approximately five and two tenths per cent., carbohydrate, approximately four per cent., a prolific growth of lactic acid bacillus and Bulgaricus bacillus, and having a caloric value per quart of approximately from eight hundred and fifty to one thousand calories, substantially as described.

2. A fermented lacteal food product of the character described containing milk, lactic acid bacillus and Bulgaricus bacillus.

3. A fermented lacteal food product of the character described containing milk, cream, egg albumen, lactic-acid bacillus and Bulgaricus bacillus.

4. A fermented milk food containing lactic acid and Bulgaricus bacilli and egg albumen.

5. The herein-described method of making a fermented lact-albumen food product, which consists in combining egg albumen with a lactael fluid, and fermenting the mixture by the action of a ferment containing lactic-acid and Bulgaricus bacilli.

6. The herein-described method of making a fermented food product, which consists in mixing a small proportion of cream with milk, sterilizing the mixture at a temperature close to but below the boiling point, and then fermenting the mixture by the action of a ferment containing lactic-acid and Bulgaricus bacilli.

7. The herein-described method of making a fermented lact-albumen food product, which consists in mixing a small proportion of cream with milk, sterilizing the mixture at a temperature close to but below the boiling point, cooling the mixture to a degree below the sterilizing temperature, adding thereto egg albumen, and then fermenting the mixture by the action of a ferment containing lactic-acid and Bulgaricus bacilli.

8. The herein-described method of making a fermented lact-albumen food product, which consists in mixing a small proportion of cream with milk, sterilizing the mixture at a temperature of about two hundred and ten degrees, cooling the mixture to a temperature between one hundred and seventy degrees and one hundred and eighty degrees, adding thereto egg albumen, and then fermenting the mixture by the action of a ferment containing lactic-acid and Bulgaricus bacilli.

9. The herein described method of making a fermented milk food product, which consists in subjecting a lacteal fluid to a process of sterilization at a temperature close to but below the boiling point, and then fermenting the sterilized fluid by the action of a ferment containing lactic acid and Bulgaricus bacilli.

In testimony whereof I affix my signature in presence of two witnesses.

ARMEN H. THOUMAIAN.

Witnesses:
AGNES I. STEWART,
BENNETT S. JONES.